US008718913B2

(12) United States Patent
Crombez

(10) Patent No.: US 8,718,913 B2
(45) Date of Patent: May 6, 2014

(54) VEHICLE EFFICIENCY INFORMATION DISPLAY AND METHOD

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1656 days.

(21) Appl. No.: 12/046,600

(22) Filed: Mar. 12, 2008

(65) Prior Publication Data

US 2009/0234528 A1 Sep. 17, 2009

(51) Int. Cl.
*G06F 19/00* (2011.01)
*G06G 7/70* (2006.01)
*G06G 7/76* (2006.01)

(52) U.S. Cl.
USPC .......... 701/123; 340/439

(58) Field of Classification Search
USPC .......... 701/123
See application file for complete search history.

(56) References Cited

U.S. PATENT DOCUMENTS 2,685,198 A 8/1954 Saul, Sr.
3,263,503 A 8/1966 White
3,977,238 A 8/1976 Byington, Jr.
4,113,046 A 9/1978 Arpino
4,463,427 A 7/1984 Bonnetain et al.
6,092,021 A * 7/2000 Ehlbeck et al. .......... 701/123
6,278,916 B1 * 8/2001 Crombez .......... 701/22
6,352,318 B1 * 3/2002 Hosomi et al. .......... 303/139
6,411,888 B1 * 6/2002 Weisman, II .......... 701/115
6,480,106 B1 11/2002 Crombez et al.
6,600,413 B1 7/2003 Lo
6,751,534 B2 6/2004 Robichaux et al.
6,794,853 B2 9/2004 Kondo
7,013,205 B1 3/2006 Hafner et al.
7,024,306 B2 4/2006 Minami et al.
7,091,839 B2 8/2006 Situ et al.

(Continued)

FOREIGN PATENT DOCUMENTS

DE 3521363 1/1986
JP 7315078 12/1995

(Continued)

OTHER PUBLICATIONS

Article entitled "Brake/Eng Run Kit", [Online] [Retrieved on Feb. 19, 2007]; Retrieved from http://www.coastaletech.com/brake.htm, 3 page.

(Continued)

*Primary Examiner* — Imran Mustafa
(74) *Attorney, Agent, or Firm* — David B. Kelley; Brooks Kushman P.C.

(57) ABSTRACT

An efficiency information display for a vehicle includes an indicator arrangement having a visual display configured to provide vehicle efficiency information to an operator of the vehicle. The visual display includes a target vehicle efficiency. A control system, including at least one controller, is configured to receive at least one input related to current operating conditions of the vehicle. The control system provides at least one output to the indicator arrangement, such that the visual display indicates to the vehicle operator a current relative operating efficiency of the vehicle. The at least one input includes at least one of: information related to positive vehicle propulsion, information related to vehicle braking, or information related to vehicle creep torque cancellation. The control system is further configured to use the at least one input to determine the current relative operating efficiency of the vehicle independently from a fuel economy calculation for the vehicle.

20 Claims, 5 Drawing Sheets

(56) References Cited

U.S. PATENT DOCUMENTS

| | | | | |
|---|---|---|---|---|
| 7,726,255 | B2 * | 6/2010 | Nakamichi | 116/62.4 |
| 2005/0128065 | A1 | 6/2005 | Kolpasky et al. | |
| 2007/0203625 | A1 * | 8/2007 | Quigley et al. | 701/33 |
| 2007/0208468 | A1 | 9/2007 | Sankaran et al. | |
| 2008/0059035 | A1 | 3/2008 | Siddiqui et al. | |

FOREIGN PATENT DOCUMENTS

| | | | |
|---|---|---|---|
| JP | 10129298 | | 5/1998 |
| JP | 2004290000 | | 10/2004 |
| WO | 2006001809 | A1 | 1/2006 |
| WO | 2006085193 | A1 | 8/2006 |

OTHER PUBLICATIONS

Article entitled "Lexus RX 400h Hybrid Overview", [Online] [Retrieved on Feb. 19, 2007]; Retrieved from http://www.lexus.com/pdf/models/rxh_driving_performance_guide.pdf, 31 pages.

* cited by examiner

VEHICLE EFFICIENCY INFORMATION DISPLAY AND METHOD

BACKGROUND OF THE INVENTION

1. Field of the Invention

The present invention relates to an efficiency information display for a vehicle and a method for displaying vehicle efficiency information.

2. Background Art

All vehicles, whether passenger or commercial, include a number of gauges, indicators, and various other displays to provide the vehicle operator with information regarding the vehicle and its surroundings. With the advent of new technologies, such as hybrid electric vehicles (HEV's), has come a variety of new gauges and information displays that help drivers to better learn the operation of these vehicles that utilize new technology. For example, many HEV's incorporate gauges that attempt to provide the driver with information on the various hybrid driving states. For example, some gauges will indicate to the driver when the vehicle is being propelled by the engine alone, the motor alone, or a combination of the two. Similarly, a display may indicate when the motor is operating as a generator, and is recharging an energy storage device, such as a battery.

In addition to indicating power flow, some gauges on HEV's indicate an instantaneous fuel economy. Although helpful in some situations, gauges of this type can give a driver a false sense of improved efficiency under certain conditions. For example, during regenerative braking—i.e., braking that results from a negative torque output by an electric motor—a gauge may indicate that the battery is charging and fuel economy is very high. A gauge of this type can lead a driver to believe that more aggressive braking is better since the fuel economy indicator reaches a maximum. In situations where the battery is fully charged, or braking is so aggressive as to initiate friction braking, efficiency is actually reduced; unfortunately, this is not apparent to the driver. In addition, even though an instantaneous fuel economy may be very high, greater efficiency may be able to be achieved if the driver operates the vehicle in a less aggressive manner during both acceleration and deceleration. Thus, merely indicating regenerative braking or instantaneous fuel economy may not provide an accurate picture as to vehicle operating efficiency.

Therefore, a need exists for an efficiency information display for a vehicle, and a method for displaying such information, that provides information independently from an instantaneous fuel economy measurement.

SUMMARY OF THE INVENTION

Embodiments of the present invention provide an information display to a vehicle operator that indicates when the vehicle is being operated in an efficient manner. Similarly, it indicates to the vehicle operator when the vehicle is being operated inefficiently. There are a number of different driving behaviors that are known to waste energy, and ultimately result in reduced efficiency. Even though such a reduction in efficiency may result in lower fuel economy, these factors are not measured by a comparison of instantaneous fuel economy in the various states of operation. Rather, certain behaviors such as: hard acceleration, high driving speed, braking beyond the regenerative braking limits, air conditioning use, and inadequate or partial creep torque cancellation, are analyzed independently from their effect on instantaneous fuel economy.

"Creep" is a term that describes the typical positive torque at or near zero vehicle speed that is developed by a conventional, non-hybrid powertrain, utilizing an internal combustion engine coupled with an automatic transmission. Such a powertrain will typically produce torque that tends to slowly propel the vehicle forward when in a forward gear at or near zero vehicle speed. This is a natural behavior to which vehicle operators have become accustomed. HEV powertrains typically do not require this behavior, since the engine is often disconnected or shut down at or near zero vehicle speeds. This also applies to electric vehicle (EV) powertrains, which do not have engines. To mimic conventional vehicle behavior, however, the electric motor of an HEV or EV is often used to simulate torque which causes creep. Creep torque cancellation is the process of actively lowering creep torque as the brake pedal is applied.

Embodiments of this invention can be used with both conventional vehicles and non-conventional vehicles, such as HEV's and EV's. One form of an information display in accordance with embodiments of the present invention may include a scale that increases from a point of lowest efficiency to a point of highest efficiency as determined by analyzing a number of vehicle operating conditions, such as the conditions resulting from the driving behaviors mentioned above.

Other embodiments of the invention may include an information display that is separated by braking events and driving events. Thus, when the vehicle is in a braking event, the efficiency will be indicated on the braking event portion of the display, and will indicate greater or lesser efficiency based on, for example, how aggressively the brakes are being applied. On the driving events portion of the display, any of a number of factors related to positive vehicle propulsion may be analyzed. For example, an amount of positive wheel torque may be analyzed, an amount of power at the vehicle wheels, an amount of positive vehicle acceration, or even accelerator pedal position may be analyzed. It is worth noting that although the torque and power mentioned above are "wheel torque" and "wheel power", other power or torque measurements may be used.

One reason to analyze the amount of positive vehicle propulsion is because aerodynamic drag tends to create efficiency losses that are typically higher at higher vehicle speeds. Thus, in embodiments of the present invention, a calculated efficiency will be reduced from a theoretical maximum or target value by some relative amount of position propulsion of the vehicle. This relative amount may be, for example, a current wheel torque measurement as a percentage of some reference value, such as the maximum possible wheel torque for the vehicle. Similarly, as discussed above, the reduction in efficiency resulting from aggressive braking may be quantified as the current braking event as a percentage of a predetermined braking amount. This predetermined braking amount may be, for example, a certain amount of braking after regenerative braking has ended. There may be a number of ways to measure the braking event, such as the change in brake pedal position as measured over time, or a change in brake pedal pressure measured over time.

Another of the driving behaviors that may reduce efficiency, and that may be considered by embodiments of the present invention, is the amount of creep torque cancellation occurring during vehicle operation. For example, if the vehicle operator is not engaging the brake pedal, and has the accelerator pedal fully closed, the vehicle may move forward at a very slow speed; this is generally known as creep. Although an electric machine, such as a motor, may be generally inefficient at very low speeds, it may be presumed in this situation that the vehicle operator requires the vehicle to move forward at a very slow rate of speed. By having neither the accelerator pedal nor the brake pedal engaged, the vehicle operation is generally efficient to the extent it can be at such a low speed. Similarly, if the vehicle operator engages the brake to the extent that the friction brakes keep the vehicle from moving forward, some HEV powertrains will shut off the engine and reduce the torque output from the motor to zero upon ample application of the brake pedal. This situation is also inherently efficient, in that there is minimal or no positive torque output fighting the application of the brakes.

An inefficient situation can readily occur, however, if a vehicle operator applies the brakes only partially during a creep situation, thereby allowing some positive torque to be output from the motor, while the brakes are being used to resist that output. Therefore, information displays in accordance with the present invention can reduce an efficiency based on partial creep torque cancellation. For example, in some embodiments, there may be no reduction in efficiency for zero creep torque cancellation or full creep torque cancellation; however, where the vehicle operator only partially cancels the creep torque, the efficiency gauge can show a reduction in efficiency from the maximum or target level. The creep torque cancellation factor indicated on the display may be linearly or non-linearly related to the amount of partial creep torque cancellation. The same is true for the other factors described above—i.e., they may be linearly or non-linearly related to the determined operating conditions.

Embodiments of the invention also include an efficiency information display for a vehicle including a powertrain operable to provide torque to propel the vehicle and a braking system operable to oppose vehicle propulsion. The powertrain may include, for example, one or more engines, one or more electric motors, or some combination thereof. The braking system includes at least a friction braking system. The information display includes an indicator arrangement including a visual display configured to provide vehicle efficiency information to an operator of the vehicle. The vehicle display includes a target vehicle efficiency. A control system includes at least one controller, and is configured to receive at least one input related to current operating conditions of the vehicle. The control system is also configured to provide at least one output to the indicator arrangement such that the visual display indicates to the vehicle operator a current relative operating efficiency of the vehicle. The at least one input includes at least one of: information related to positive vehicle propulsion, information related to vehicle braking, or information related to vehicle creep torque cancellation. The control system is further configured to use the at least one input to determine the current relative operating efficiency of the vehicle independently from a fuel economy calculation for the vehicle.

Some embodiments of the present invention may consider other factors affecting efficiency, such as use of accessories, for example, the use of an air conditioning system (AC). Certain accessories, such as an AC, can use relatively large amounts of electrical power, thereby reducing the relative operating efficiency of the vehicle. Thus, certain embodiments may provide an input or inputs to the control system to indicate the status of vehicle accessories, identified by device or system, or indicated by a certain power consumption. This type of status indicator may be limited to when such accessories are in a "manual-on" state. In this case, manual-on may include one or both of a specific selection of AC by the vehicle occupant, or a temperature setting by a vehicle occupant for the vehicle cabin that results in an automatic climate control system turning on the AC.

In contrast, an accessory could be turned on "automatically"—i.e., as a result of a secondary selection by a vehicle occupant. For example, in the case of AC, the vehicle occupant may select defrost, or an automatic climate control may initiate defrost based on ambient conditions. In such a case, the AC may be on, but the efficiency displayed will not be reduced, since it may be undesirable to indicate reduced efficiency when defrost AC aids in clearing the windshield.

Embodiments of the present invention may include an efficiency information display for a vehicle similarly configured to one described above, but the visual display may include a first region indicating efficiency information related to braking events, and a second region indicating efficiency information related to driving events. The visual display may further include an indicator of relative maximum efficiency. To calculate the current relative operating efficiency, the control system can be configured with an algorithm that uses some or all of the various factors described above. For example, the algorithm may include an equation in the form of:

$$E_G = E_M - E_P - E_B - E_C - E_{AC} \text{ where:}$$

$E_G$ is the relative vehicle operating efficiency, $E_M$ is the relative maximum vehicle operating efficiency, $E_P$ is the reduction in relative vehicle operating efficiency due to positive vehicle propulsion, $E_B$ is the reduction in relative vehicle operating efficiency due to braking, $E_C$ is the reduction in relative vehicle operating efficiency due to creep torque cancellation, and $E_{AC}$ is the reduction in relative vehicle operating efficiency due to air conditioning use.

Embodiments of the invention also include a method for providing vehicle efficiency information to an operator of a vehicle. The vehicle includes a powertrain operable to provide torque to propel the vehicle and a braking system operable to oppose vehicle propulsion. The powertrain may include, for example, one or more engines, one or more electric motors, or some combination thereof. The braking system includes at least a friction braking system. The method includes determining information related to current operating conditions of the vehicle, including at least one of: information related to positive vehicle propulsion, information related to vehicle braking, or information related to vehicle creep torque cancellation. A relative operating efficiency of the vehicle is determined independently from a fuel economy determination, and is based at least in part on the determined information related to the current operating conditions of the vehicle.

The relative operating efficiency of the vehicle is: inversely related to the relative amount of positive vehicle propulsion, inversely related to the relative amount of braking, and higher during zero creep torque cancellation and full creep torque cancellation than during partial creep torque cancellation. The determined relative operating efficiency of the vehicle is then indicated to the vehicle operator. It is worth noting that as used above, the term "inversely related" does not imply a linear relationship, because, as explained in detail below, the relative operating efficiency of the vehicle may be dependent on different factors, at least some of which may have non-linear relationships to the determined efficiency.

DETAILED DESCRIPTION OF EMBODIMENTS OF THE INVENTION

Figure 1:
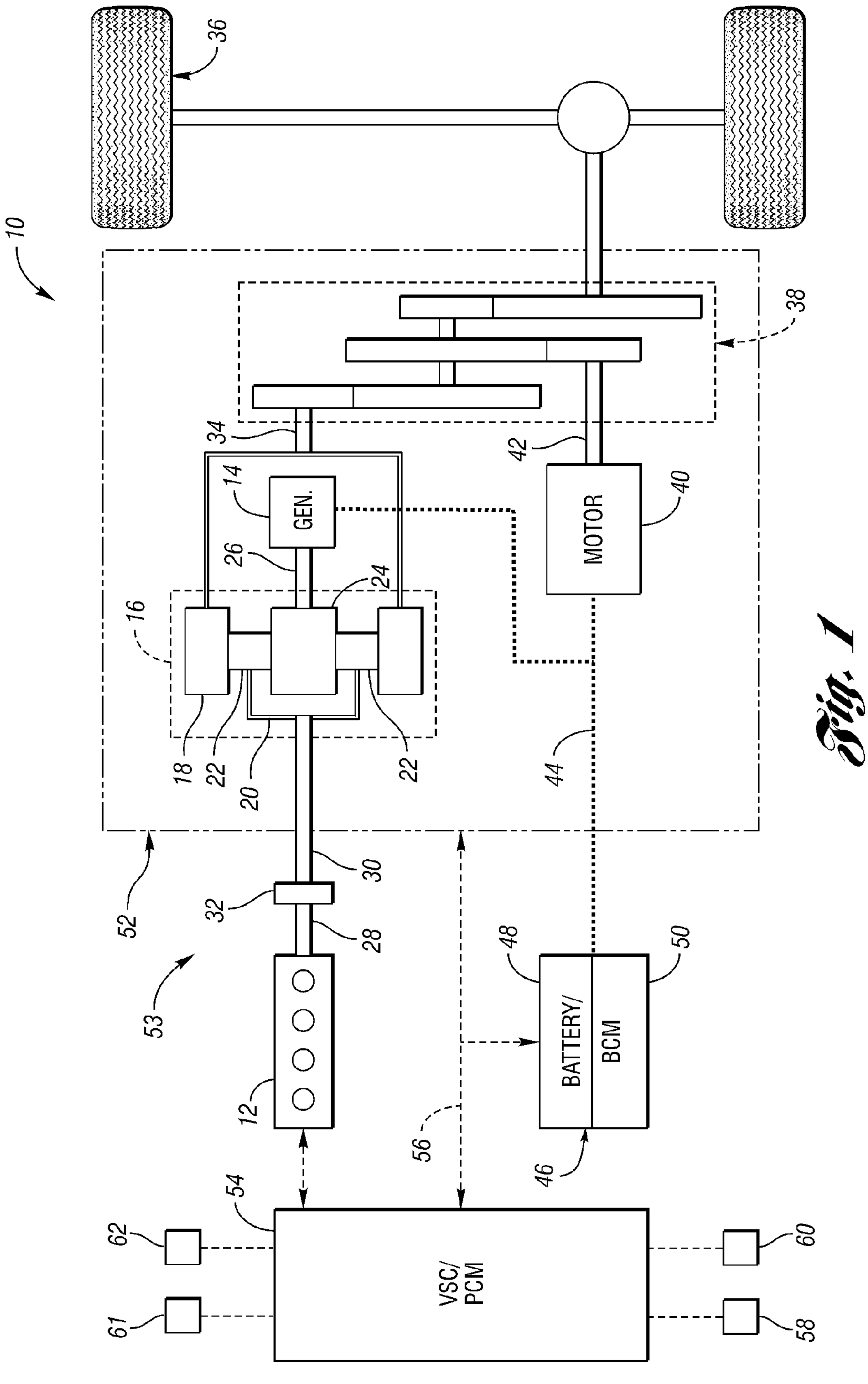
FIG. 1 shows a schematic representation of a hybrid electric vehicle including an efficiency information display in accordance with one embodiment of the present invention.

FIG. 1 shows a schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. In addition, the engine 12 and the transmission make up at least a portion of a vehicle powertrain 53, which may include other components such as shafts or differentials not labeled separately in FIG. 1. To control the engine 12 and components of the transmission 48—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 50 to communicate with the transmission 52 and the BCM 50. Just as the battery 48 includes a BCM 50, other devices controlled by the VSC/PCM 54 may have their own controllers. For example, an engine control unit (ECU) may communicate with the VSC/PCM 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present invention. Although illustrated and described in the context of the vehicle 10, which is an HEV, it is understood that embodiments of the present invention may be implemented on other types of vehicles, such as those powered by an engine or electric motor alone.

Also shown in FIG. 1 are simplified schematic representations of a braking system 58, an accelerator pedal 60, and an air conditioning system 61. The braking system 58 may include such things as a brake pedal, position sensors, pressure sensors, or some combination of the two, as well as a mechanical connection to the vehicle wheels, such as the wheels 36, to effect friction braking. Similarly, the accelerator pedal 60 may include one or more sensors, which, like the sensors in the braking system 58, communicate with the VSC/PCM 54.

The air conditioning system 61 also communicates with the VSC/PCM 54, providing such information as its on/off status. The on/off status can be based on, for example, the status of an operator actuated switch, or the automatic control of the air conditioning system 61 based on related functions such as window defrost. In addition to the foregoing, the vehicle 10 includes an information display 62, which, as explained in detail below, provides vehicle efficiency information to an operator of the vehicle 10.

Figure 2:
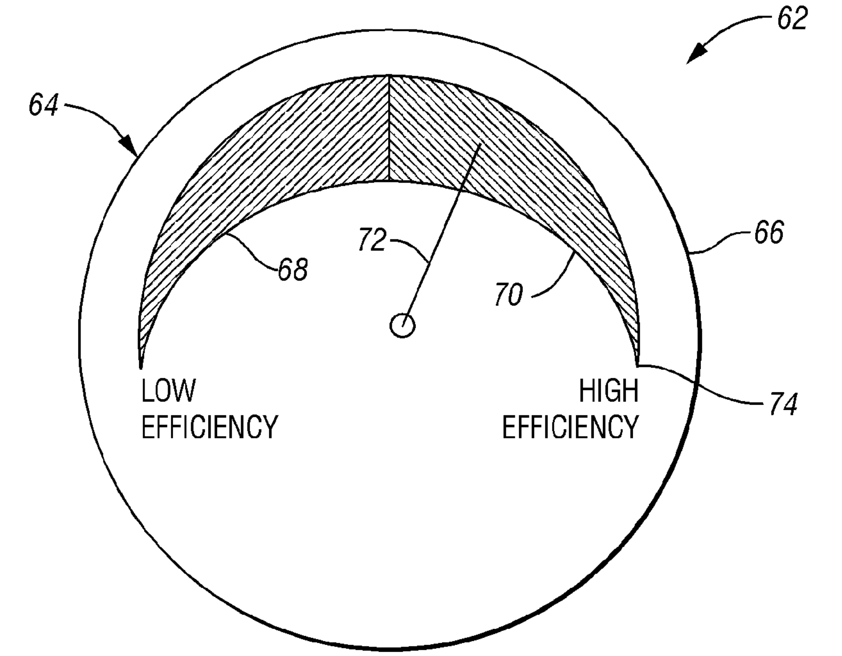
FIG. 2 shows in detail the efficiency information display shown in FIG. 1.

FIG. 2 shows the information display 62 in detail. The information display 62 includes an indicator arrangement 64, which may include such things as a visual display 66, and electronics, including software, which are not shown in FIG. 2. The visual display 66 shows two regions: a region of low efficiency 68 and a region of high efficiency 70. Although they are shown as two separate regions, the regions 68, 70 may be indicated on an indicator such as the visual display 66, by showing one single region that varies from low efficiency to high efficiency as the indicator needle 72 moves in one direction, for example, in a clockwise fashion. In the embodiment shown in FIG. 2, the visual display 66 has a point of highest efficiency at one end 74 of the high efficiency region 70. Depending on the particular configuration, and the vehicle operating conditions, it may not be possible to operate a vehicle, such as the vehicle 10, at the point of highest efficiency 74, but the point 74 still may be considered a target vehicle efficiency. Although the vehicle 10 illustrated in FIG. 1 and described above is an HEV, the information display 62 can also work with other vehicle types, such as conventional, non-hybrid vehicles and EV's.

In addition to the indicator arrangement 64, the efficiency information display also includes a control system, which, for reference purposes, may be considered the VSC/PCM 54 shown in FIG. 1. The VSC/PCM 54 is configured to receive inputs related to current operating conditions of the vehicle 10, and to provide outputs to the indicator arrangement 64 such that the visual display 66 indicates to the vehicle operator a current relative operating efficiency of the vehicle. There are a number of factors that may cause a vehicle, such as the vehicle 10, to be operated in an inefficient manner. For example, if the vehicle operator aggressively engages the accelerator pedal 60, aerodynamic drag can adversely impact the vehicle efficiency. Similarly, a very aggressive braking event will also reduce the operating efficiency of a vehicle. In the case of an HEV, such as the vehicle 10 shown in FIG. 1, aggressive braking may cause the friction brakes to engage, thereby reducing or eliminating the capture of regenerative braking energy.

Figure 3:
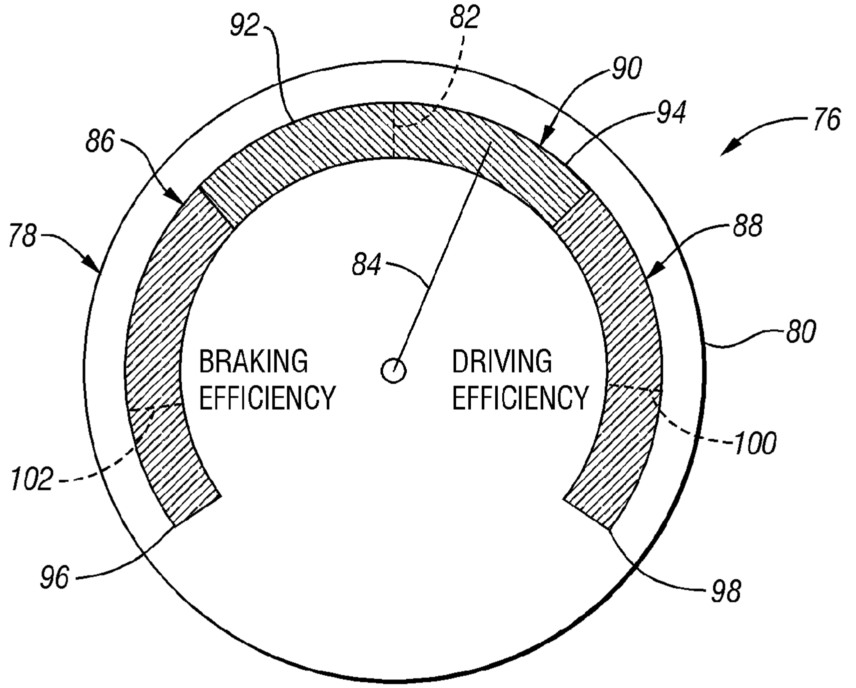
FIG. 3 shows an efficiency information display in accordance with another embodiment of the present invention.

In order to provide more detailed information, an efficiency information display may be configured like the information display 76 shown in FIG. 3. The information display 76 also includes an indicator arrangement 78, having a visual display 80, and a control system, such as the VSC/PCM 54 shown in FIG. 1. Like the visual display 66 shown in FIG. 2, the visual display 80 also includes a target vehicle efficiency 82. The target vehicle efficiency 82 may be considered a point of theoretical maximum operating efficiency, and therefore a desired point at which to operate a vehicle, such as the vehicle 10. The visual display 80 also includes an indicator needle 84, and it is worth noting that like the indicator needle 72 shown in FIG. 2, the indicator needle 84 may be made up of lights, such as light emitting diodes (LED's), or other types of indicators.

The visual display 80 includes two primary regions, a first region 86 indicating efficiency information related to braking events, and a second region 88 indicating efficiency information related to driving events. In general, everything to the left of the target vehicle efficiency 82 indicates braking efficiency, and everything to the right of the target vehicle efficiency 82 indicates driving efficiency. The visual display 80 also includes a third region 90, having a first portion 92 disposed within the braking efficiency region 86, and a second portion 94 disposed within the driving efficiency region 88. The region 90 indicates a desired operating region for both driving events and braking events.

It is worth noting that although the portion 92 of the desired operating region 90 is shown as a region distinct from the braking efficiency region 86, in some embodiments, the braking efficiency region 86 may include a visual indicator, such as a color gradient that seamlessly changes color from the target vehicle efficiency 82 to the point of lowest efficiency 96 for braking events. Similarly, the driving efficiency region 88 may also include a color gradient or other shaded gradient that seamlessly changes from the target vehicle efficiency 82 to the point of lowest efficiency 98 for driving events. In one example, the points of lowest efficiency 96, 98 may be indicated in bright red with the color changing in both the braking efficiency region 86 and the driving efficiency region 88 as the visual display 80 moves upward toward the target vehicle efficiency 82, which may be indicated in a dark green color.

Also shown on the visual display 80 are two dotted lines 100, 102. The line 100 indicates the point at which an engine, such as the engine 12 shown in FIG. 1, is started, and the line 102 indicates the point at which the limit of regenerative braking is reached and friction braking begins. Thus, during driving events of an HEV, such as the vehicle 10 shown in FIG. 1, the visual display 80 may indicate reduced efficiency as vehicle propulsion—e.g., wheel torque—increases. This may occur even when the vehicle 10 is being driven exclusively by the motor 40. At some point, whether to charge the battery 48 or to provide additional torque demanded by the driver, the engine 12 will be started: this is indicated at line 100. Similarly, engaging the braking system 58 reduces the efficiency of the vehicle even during regenerative braking, which does capture some energy to be transferred and stored in the battery 48. When braking is very aggressive, it may be necessary for the friction brakes to be engaged, and this is indicated by the line 102. It is understood that other embodiments of the present invention may include only one of, or neither of, the lines 100, 102.

Although shown in FIG. 3 as being located well into their respective regions 88, 86, the engine start line 100 and friction braking start line 102 may be at different locations on the visual display 80. For example, the engine start line 100 may be located at the intersection of the regions 88, 90, and the friction braking start line 102 may be located at the intersection of the regions 86, 90. Moreover, each of lines 100, 102 may be located within the region 90. A display of the type illustrated in FIG. 3 does more than merely indicate when the engine is on, or when friction brakes are in use. Rather, it allows the vehicle operator to see when these points are being approached, thereby allowing the operator to modify his or her driving behavior to keep the vehicle in an electric power only mode, or a regenerative braking only mode.

Figure 4:
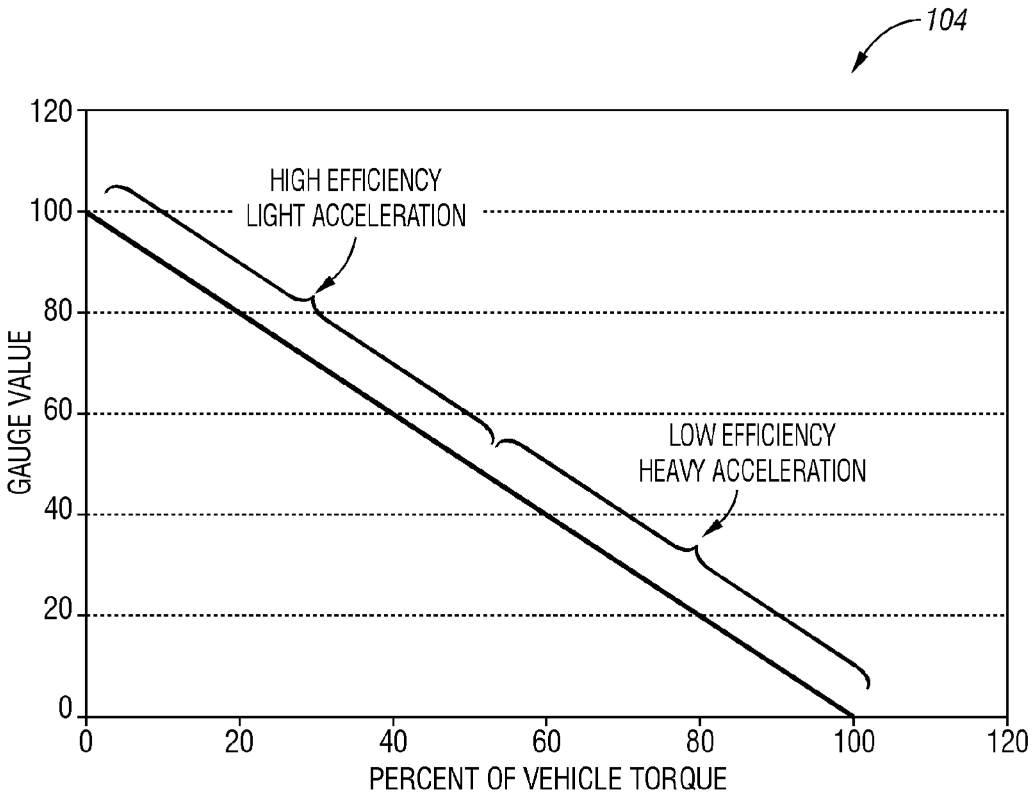
FIG. 4 shows a graph illustrating the relationship between the efficiency information display gauge value and a percent of the vehicle torque.

As discussed above, there are a number of events that may reduce the operating efficiency of a vehicle, such as the vehicle 10. For example, FIG. 4 shows a graph 104 that illustrates a way to calculate a reduction in efficiency based on a percent of vehicle torque. As noted above, efficiency losses resulting from aerodynamic drag are related to the vehicle propulsion, which can be measured by various parameters such as a vehicle torque, vehicle speed, vehicle power, vehicle acceleration, accelerator pedal position, or some combination thereof. Each of these parameters may be quantified as a relative value—e.g., an actual, measured, or inferred value, compared to a reference value for that parameter. In the embodiment shown in FIG. 4, there is a linear relationship between the percent of vehicle torque and the "gauge value" that would be displayed on an information display, such as the information display 62 shown in FIG. 2, or the information display 76 shown in FIG. 3.

As shown in FIG. 4, the gauge value is at a maximum (100) when there is no vehicle torque. Conversely, the gauge value is at a minimum (0) when the vehicle torque is at a maximum (100). For any given set of operating conditions, there will be a maximum amount of vehicle torque available to be demanded by the driver. This is the value (100) shown along the abscissa of the graph 104. It is worth noting that although the graph 104 shows a linear relationship between the gauge value and the percent of the vehicle torque, non-linear relationships may also exist, and may be used to determine the vehicle efficiency and the subsequent display of that efficiency on an information display such as the information display 62 or the information display 76, respectively shown in FIGS. 2 and 3.

As shown in the graph 104, the gauge value starts at a maximum when the percent of vehicle torque is at 0. In such a situation, an indicator, such as the needle indicator 84 shown in FIG. 3, may be at or near the target vehicle efficiency 82. As the percent of vehicle torque increases, the gauge value is accordingly decreased, and since this is during a driving event, the indicator 84 shown in FIG. 3 will move clockwise away from the target vehicle efficiency 82 as the percent of vehicle torque increases. Although not shown in FIG. 4, the engine start line could be indicated on a graph, such as the graph 104, with the vehicle operating conditions determining its location.

Figure 5:
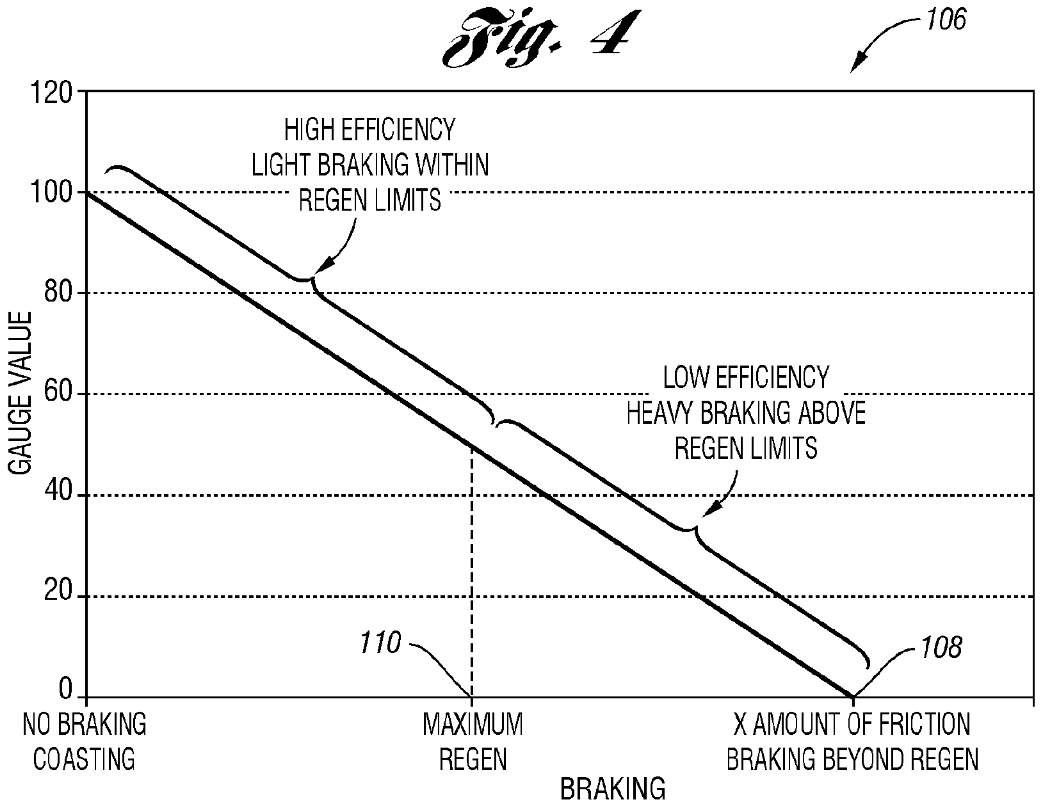
FIG. 5 shows a graph illustrating the relationship between the efficiency information display gauge value and vehicle braking.

Another factor that can reduce the efficiency of the vehicle is the amount of braking. FIG. 5 shows a graph 106 that shows the gauge value at a maximum when there is no braking and at a minimum at some reference amount of braking 108. In the embodiment shown in FIG. 5, the reference amount of braking 108 represents some "x amount" of friction braking beyond the regenerative braking limit 110. Similar to the graph 104 shown in FIG. 4, the graph 106 shows a linear relationship between the gauge value and the amount of braking. Of course, other types of relationships, including non-linear relationships, may be used. Correlating the graph 106 to the information display 76 shown in FIG. 3, the maximum regenerative braking level 110 shown in FIG. 5 is analogous to the line 102 on the visual display 80. It is clear from the graph 106 shown in FIG. 5 that lighter braking within the limits of regenerative braking provides greater efficiency than heavy braking, particularly when such braking goes beyond regenerative braking limits.

Figure 6:
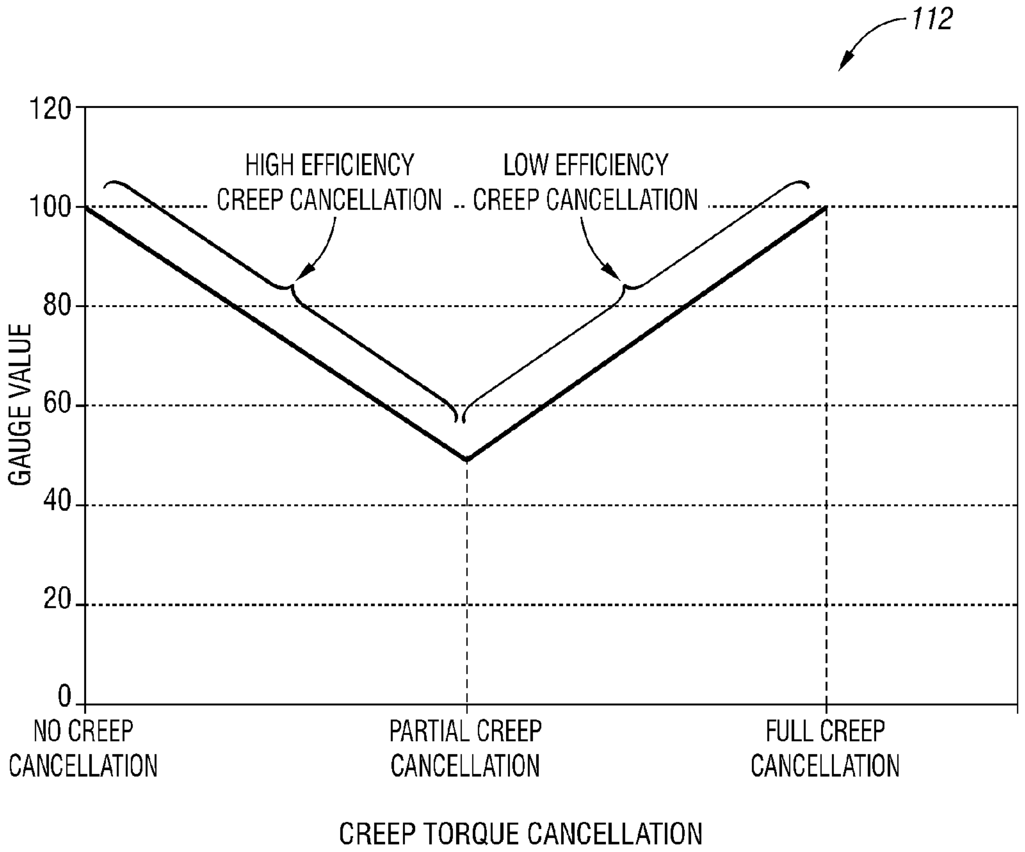
FIG. 6 shows a graph illustrating the relationship between the efficiency information display gauge value and a percent of partial creep torque cancellation.

FIG. 6 shows a graph 112 illustrating the relationship between the gauge value and the amount of creep torque cancellation. As explained above, if a vehicle is moving slowly forward—i.e., it is being propelled by creep torque—and the vehicle operator is not applying the brakes, it is presumed that this movement is desired. Therefore, in such a situation, the gauge value will not be reduced since there is no creep torque cancellation. Similarly, when there is full creep torque cancellation, the gauge value is also at 100%. This is because in the case of an HEV, such as the vehicle 10 shown in FIG. 1, an application of the brakes that cancels all of the creep torque will cause the motor torque to go to zero. In this situation, there is no conflict between positive torque output trying to move the vehicle and a braking system opposing that propulsion. Rather, this conflict occurs when there is partial creep torque cancellation, and as shown in FIG. 6, these situations result in a reduction in the gauge value proportional to the amount of partial creep torque cancellation. Although the relationship between the gauge value and the amount of partial creep torque cancellation is shown as linear in FIG. 6, other relationships, including non-linear relationships, may be utilized.

Some embodiments of the present invention may consider other factors affecting efficiency, such as use of accessories, for example, the use of AC. Certain embodiments may provide an input or inputs to the control system to indicate the status of vehicle accessories, identified by device or system, or indicated by a certain power consumption. In such a case, the efficiency can be reduced by a constant amount whenever the AC switch is on, or it can be reduced intermittently, for example, only when the compressor is active. In some embodiments, the reduction in efficiency can be related to the amount of power actually being consumed.

In order to effect the proper display on an information display, such as the display 62 shown in FIG. 2 or the display 76 shown in FIG. 3, a control system, such as the VSC/PCM 54, may be preprogrammed with an algorithm that calculates a relative operating efficiency and effects the output on the information display. For example, one algorithm that can be used is as follows.

$E_G = E_M - E_P - E_B - E_C - E_{AC}$ where:

$E_G$ is the relative vehicle operating efficiency, $E_M$ is the relative maximum vehicle operating efficiency, $E_P$ is the reduction in relative vehicle operating efficiency due to positive vehicle propulsion, $E_B$ is the reduction in relative vehicle operating efficiency due to braking, $E_C$ is the reduction in relative vehicle operating efficiency due to creep torque cancellation, and $E_{AC}$ is the reduction in relative vehicle operating efficiency due to air conditioning use.

As shown in the equation above, there is an inverse relationship between the relative vehicle operating efficiency and each of the factors $E_P$, $E_B$, $E_C$, and $E_{AC}$. That is, as each of these factors increases, the relative vehicle operating efficiency ($E_G$) is reduced. Examples of relationships for $E_P$, $E_B$, and $E_C$, are also illustrated in FIGS. 4-6. In the equation shown above, the relative maximum vehicle operating efficiency may be assumed to be 100 and the factors $E_P$, $E_B$, $E_C$, and $E_{AC}$ are in percent. In addition to using algorithms, such as the one illustrated above, lookup tables and other types of information retrieval, calculation, and storage may be used to determine the appropriate level of vehicle efficiency indicated on an information display, such as the display 62 shown in FIG. 2, or the display 76 shown in FIG. 3. The needle indicator 84 is presumed to start at the target vehicle efficiency 82, and is then reduced according to each of the calculated factors. Although there are four efficiency factors described in the examples above, and used in the equation, other efficiency factors may be used.

Figure 7:
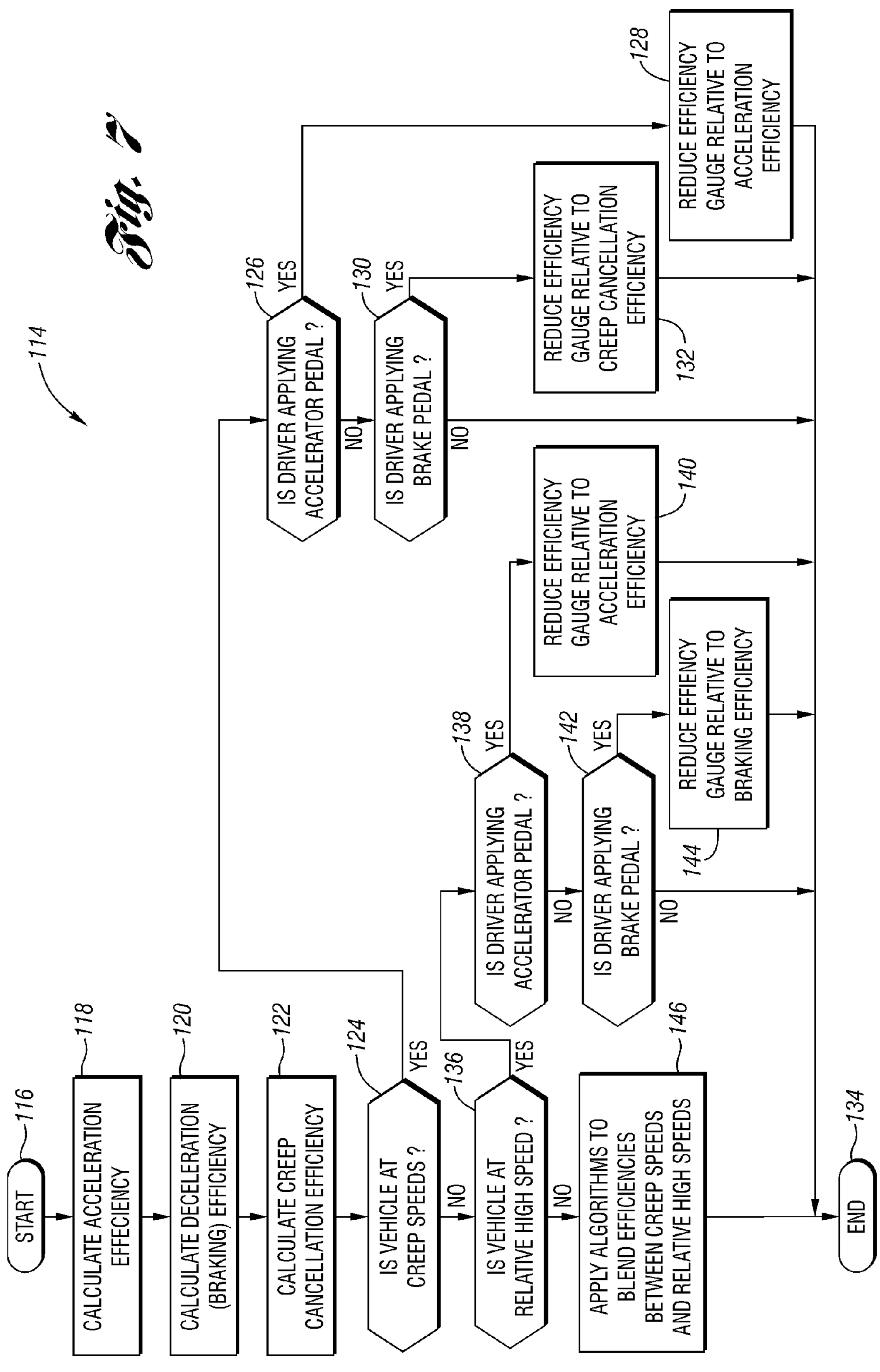
FIG. 7 shows a flowchart illustrating the steps in accordance with an embodiment of the present invention.

FIG. 7 shows a flowchart 114 illustrating a method in accordance with an embodiment of the present invention. The method is initiated at step 116, and then various efficiencies are calculated at steps 118, 120, 122. In particular, information related to current operating conditions of the vehicle will be determined, such as the amount of positive vehicle propulsion, the amount of vehicle braking, and the amount of creep torque cancellation. As discussed in detail above, the amount of positive vehicle propulsion, such as torque, speed, power, acceleration, and accelerator pedal position, can provide a relative vehicle efficiency based on losses resulting from such things as aerodynamic drag; this is illustrated in step 118, where it is labeled "acceleration efficiency". Similarly, losses resulting from braking events result in a braking efficiency, which is illustrated in step 120. The creep torque calculation efficiency as described above and illustrated in FIG. 6, is shown in step 122 in FIG. 7. Although these various calculations are shown in a particular order, it is understood that they may be calculated in a different order, or, depending on the particular operating conditions, fewer than all three of these calculations may be performed.

At decision block 124, it is determined whether the vehicle is operating at creep speeds. If it is, another decision is made at block 126, where it is determined whether the driver is applying the accelerator pedal. If the driver is applying the accelerator pedal, the efficiency gauge reduces the indicated efficiency from the maximum relative to the acceleration efficiency calculated. This is shown in step 128. Conversely, if at decision block 126 it is determined that the driver is not applying the accelerator pedal, it is next determined whether the driver is applying the brake pedal—see step 130. If the driver is applying the brake pedal, the efficiency gauge is reduced relative to creep torque cancellation at step 132. If the driver is not applying the brake pedal, the process advances from step 130 to the end at step 134.

Returning to decision block 124, if it is determined that the vehicle is not at creep speeds, it is next determined at decision block 136 whether the vehicle is at a relatively high speed. If the answer is "yes", it is next determined at decision block 138 whether the driver is applying the accelerator pedal. If the accelerator pedal is being applied, the efficiency gauge is reduced from the target level relative to the acceleration efficiency—see step 140. If, however, the driver is not applying the accelerator pedal, a decision is made at block 142 whether the driver is applying the brake pedal. If the answer is "yes", the efficiency gauge is reduced relative to the braking efficiency at 144, and if the driver is not applying the brake pedal, the process moves to the end at step 134.

Returning to decision block 136, it is shown that when the vehicle is not at a relatively high speed, and as previously determined at decision block 124 it is not operating at a creep speed, then algorithms are applied to blend the efficiencies between the creep speeds and the relative high speeds at step 146. This may, for example, involve some combination of reducing the efficiency based on positive vehicle torque, power, or speed, and other factors, such as vehicle braking. It is worth noting that although a number of factors have been used for illustration, other factors may be used in accordance with embodiments of the present invention. Regardless of the various factors used to help calculate the efficiency in accordance with the present invention, at least some of the factors do not rely on the instantaneous fuel economy as an indicator of efficiency. As described above, using the information display of the present invention can help eliminate the false sense of efficient operation found in some information displays.

While the best mode for carrying out the invention has been described in detail, those familiar with the art to which this invention relates will recognize various alternative designs and embodiments for practicing the invention as defined by the following claims.

What is claimed:

1. An efficiency information display for a vehicle including a powertrain operable to provide torque to propel the vehicle and a braking system operable to oppose vehicle propulsion, the braking system including at least a friction braking system, the information display comprising:

an indicator arrangement including a visual display configured to provide vehicle efficiency information to an operator of the vehicle, the visual display including a target vehicle efficiency; and a control system including at least one controller, the control system being configured to receive at least one input related to current operating conditions of the vehicle and to provide at least one output to the indicator arrangement such that the visual display indicates to the vehicle operator a current relative operating efficiency of the vehicle, the at least one input including at least one of: information related to positive vehicle propulsion, information related to vehicle braking, or information related to vehicle creep torque cancellation, the control system being further configured to use the at least one input to determine the current relative operating efficiency of the vehicle independently from a fuel economy calculation for the vehicle.

2. The information display of claim 1, wherein the visual display includes a region of low relative operating efficiency of the vehicle and a region of high relative operating efficiency of the vehicle.

3. The information display of claim 1, wherein the visual display includes a first region indicating efficiency information related to braking events, and a second region indicating efficiency information related to driving events.

4. The information display of claim 1, the vehicle further including an accelerator pedal operable to provide to the control system a driver demand for vehicle propulsion, wherein the at least one input to the control system includes information related to positive vehicle propulsion, and the control system calculates at least one of a relative amount of positive vehicle torque, a relative amount of positive vehicle power, a relative amount of positive vehicle acceleration, or an accelerator pedal position, the current relative operating efficiency of the vehicle being inversely related to the at least one input related to positive vehicle propulsion.

5. The information display of claim 1, wherein the at least one input to the control system includes information related to vehicle braking, and the control system calculates a relative amount of braking, the current relative operating efficiency of the vehicle being inversely related to the relative amount of braking.

6. The information display of claim 1, wherein the at least one input to the control system includes information related to vehicle creep torque cancellation and the control system calculates a relative amount of creep torque cancellation, the current relative operating efficiency of the vehicle being higher during zero creep torque cancellation and full creep torque cancellation than during partial creep torque cancellation.

7. The information display of claim 1, wherein the at least one input to the control system includes information related to positive vehicle torque, information related to vehicle braking, and information related to vehicle creep torque cancellation, and the control system calculates a relative amount of positive vehicle propulsion, a relative amount of braking, and a relative amount of creep torque cancellation, the current relative efficiency of the vehicle being: inversely related to the relative amount of positive vehicle torque, inversely related to the relative amount of braking, and higher during zero creep torque cancellation and full creep torque cancellation than during partial creep torque cancellation.

8. The information display of claim 1, the vehicle further including an air conditioning system, and wherein the at least one input to the control system includes information related to the status of the air conditioning system, the current relative efficiency of the vehicle being lower when the air conditioning system is in a "manual-on" state than when the air conditioning system is in an "off" state.

9. The information display of claim 1, wherein the control system is configured with an algorithm for determining the current relative operating efficiency of the vehicle, the algorithm including the equation:

$$E_G=E_M-E_P-E_B-E_C-E_{AC} \text{ where:}$$

$E_G$ is the relative vehicle operating efficiency, $E_M$ is the relative maximum vehicle operating efficiency, $E_P$ is the reduction in relative vehicle operating efficiency due to positive vehicle propulsion, $E_B$ is the reduction in relative vehicle operating efficiency due to braking, $E_C$ is the reduction in relative vehicle operating efficiency due to creep torque cancellation, and $E_{AC}$ is the reduction in relative vehicle operating efficiency due to air conditioning use.

10. An efficiency information display for a vehicle including a powertrain operable to provide torque to propel the vehicle and a braking system operable to oppose vehicle propulsion, the braking system including at least a friction braking system, the information display comprising:

an indicator arrangement including a visual display configured to provide vehicle efficiency information to an operator of the vehicle, the visual display including a first region indicating efficiency information related to braking events, and a second region indicating efficiency information related to driving events, the visual display further including an indicator of relative maximum efficiency; and a control system including at least one controller, the control system being configured to receive at least one input related to current operating conditions of the vehicle and to provide at least one output to the indicator arrangement such that the visual display indicates to the vehicle operator a current relative operating efficiency of the vehicle, the at least one input including at least one of: information related to positive vehicle propulsion, information related to vehicle braking, or information related to vehicle creep torque cancellation, the control system being further configured to use the at least one input to determine the current relative operating efficiency of the vehicle independently from a fuel economy calculation for the vehicle.

11. The information display of claim 10, wherein the visual display further includes a third region indicating a desired operating region and including the indicator of relative maximum efficiency, one portion of the desired operating region being disposed within the first region and another portion of the desired operating region being disposed within the second region.

12. The information display of claim 10, wherein the at least one input to the control system includes information related to positive vehicle propulsion, the control system calculating a current amount of positive vehicle propulsion as a percentage of maximum available positive vehicle propulsion, and reducing the current relative operating efficiency of the vehicle based on the calculated percentage.

13. The information display of claim 12, wherein the control system reduces the current relative operating efficiency of the vehicle proportionally to the calculated percentage of maximum available positive vehicle propulsion.

14. The information display of claim 10, wherein the at least one input to the control system includes information related to vehicle braking, the control system calculating a current amount of braking as a percentage of a reference amount of braking, and reducing the current relative operating efficiency of the vehicle based on the calculated percentage.

15. The information display of claim 10, wherein the at least one input to the control system includes information related to vehicle creep torque cancellation, the control system calculating a current amount of creep torque cancellation as a percentage of a reference amount of creep torque cancellation, and reducing the current relative operating efficiency of the vehicle based on the calculated percentage.

16. The information display of claim 10, wherein the at least one input to the control system includes information related to positive vehicle torque, information related to vehicle braking, and information related to vehicle creep torque cancellation, and the control system calculates a relative amount of positive vehicle propulsion, a relative amount of braking, and a relative amount of creep torque cancellation, the current relative efficiency of the vehicle being: inversely related to the relative amount of positive vehicle torque, inversely related to the relative amount of braking, and higher during zero creep torque cancellation and full creep torque cancellation than during partial creep torque cancellation.

17. The information display of claim 10, the powertrain including an engine, and wherein the visual display further includes at least one of an indicator signifying when the engine will start or an indicator signifying when friction braking will start, thereby providing advance notice of at least one of engine start or friction braking to the vehicle operator.

18. An information display for a vehicle including a braking system operable to oppose vehicle propulsion, the braking system including at least a friction braking system, the information display comprising:

an indicator arrangement including a visual display configured to provide braking efficiency information corresponding to braking events to an operator of the vehicle, the visual display including a friction braking indicator signifying when friction braking will start; and a control system including at least one controller, the control system being configured to receive at least one input related to current vehicle braking events and to provide at least one output based at least in part on the input to the indicator arrangement such that the visual display indicates a current braking efficiency relative to the friction braking indicator.

19. The information display of claim 18, wherein the control system is further configured to calculate a relative amount of braking, the current braking efficiency of the vehicle being inversely related to the relative amount of braking.

20. The information display of claim 18, wherein the control system is further configured to calculate a current amount of braking as a percentage of a reference amount of braking, and to reduce the current braking efficiency of the vehicle based on the calculated percentage.

* * * * *